Nov. 19, 1968   J. P. MURDOCH   3,411,449
WATER-POWERED MAKE-UP AND BLEED-OFF SYSTEM
Filed March 13, 1967   2 Sheets-Sheet 1

INVENTOR:
JOHN P. MURDOCH
BY
*Howson & Howson*
ATTYS.

Nov. 19, 1968
J. P. MURDOCH
3,411,449
WATER-POWERED MAKE-UP AND BLEED-OFF SYSTEM
Filed March 13, 1967
2 Sheets-Sheet 2
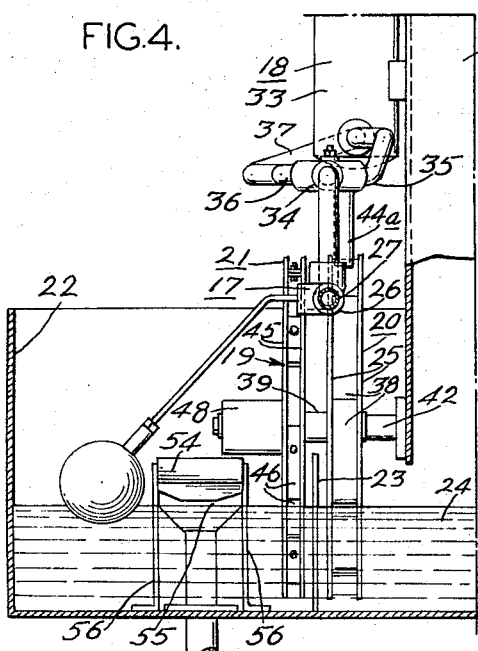
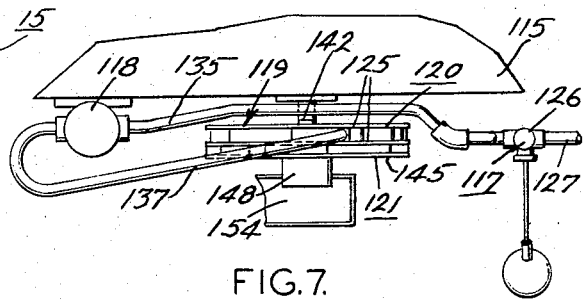
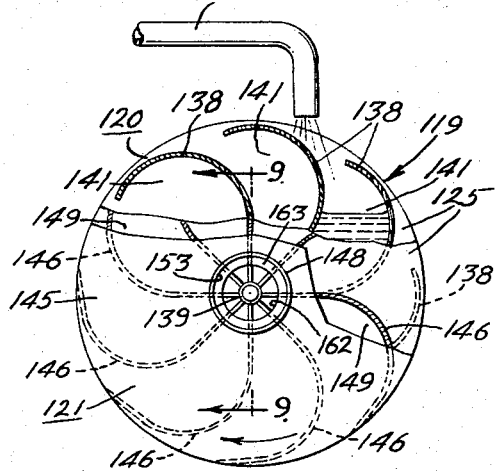
INVENTOR:
JOHN P. MURDOCH
BY
Howson & Howson
ATTYS.

United States Patent Office 3,411,449
Patented Nov. 19, 1968

3,411,449
WATER-POWERED MAKE-UP AND BLEED-OFF SYSTEM
John P. Murdoch, Ardmore, Pa.
(3630 Haverford Ave., Philadelphia, Pa. 19104)
Filed Mar. 13, 1967, Ser. No. 622,639
14 Claims. (Cl. 103—60)

ABSTRACT OF THE DISCLOSURE

A system for exchanging and replacing cooling sump water in an air-conditioning cooling tower catch basin or sump with a quantity of freshly treated make-up water. The system comprises a float-controlled make-up water valve responsive to the sump water level, a chemical additive unit for feeding a treating chemical into the make-up water entering the catch basin, and a water-powered pump having a turbine section driven by the entering make-up water and a pump section connected to the turbine section to remove a lesser quantity of sump water from the catch basin to a discharge drain.

Background of the invention

The present invention relates to the exchange and replacement of water in water cooling systems and has particular application to air-conditioning cooling towers for maintaining the water level and at the same time automatically controlling the concentration of chemicals or other foreign material in the water.

In evaporative cooling towers for refrigeration systems such as air-conditioners, the cooling water is sprayed into the top of a cooling tower and is collected at the bottom and recirculated. The evaporation of the water in the cooling tower cools the water. In the operation of the cooling tower, the circulated water picks up considerable quantities of dust, dirt, and the like; and in cases where the cooling water has a chemical additive to retard corrosion or rust in the pipes of the cooling system, the evaporation of the cooling water causes a buildup of the concentration of the chemical additive. It is therefore desirable to periodically bleed-off quantities of the sump water in the catch basin and replace the water with fresh make-up water to reduce the chemical concentration and the dust and dirt in the water to acceptable operating limits.

In many cooling tower installations, it is the duty of the operating engineer in charge to manually bleed-off periodically a quantity of sump water and replace it with fresh make-up water. In the operation of these installations, this procedure is often neglected.

It has been proposed to provide an automatic make-up and bleed-off water system to add and exchange the water. In one system an electric switch is actuated by a float riding on the surface of the water in the catch basin. When the level of water in the basin is lowered due to evaporation and other causes, the float in the lowered position causes the switch to energize an electric motor which drives a make-up water inlet pump and sump water discharge pump. The make-up water pump adds a quantity of water to the catch basin and the discharge pump removes a lesser quantity of water from the basin. This exchanges and adds water until the water level in the basin is raised to the normal operating level when the float and switch de-energize the motor.

Another proposed water system has a similar electric switch and float which controls a normally closed, make-up water inlet solenoid valve and a sump water discharge solenoid valve. When a low water level exists in the catch basin, the switch actuates the inlet and discharge valves to an open position to allow a quantity of make-up water to enter the catch basin and a lesser quantity of sump water to drain from the basin.

Systems such as the foregoing have several disadvantages. A primary disadvantage is the high cost of labor and material necessary to provide electrical power to the usually remote locations of air-conditioning cooling towers. Another disadvantage is the high cost of the electrically driven pumps and valves used in the system.

Summary of the invention

Generally, the present invention comprises a water-powered system to exchange and replace the cooling water in an air-conditioning cooling tower and/or an evaporative condenser. The system is entirely water-powered and has a make-up water inlet valve responsive to the water level in the air-conditioning cooling tower catch basin or sump; a make-up water turbine, powered by the make-up water entering the basin; and a sump water discharge pump, driven by the turbine to pump a quantity of the sump water from the basin to a drain.

In operation, as a quantity of water is evaporated or otherwise lost from the cooling system, the water level in the catch basin is lowered and the make-up water inlet valve responds to the lowered water level by allowing make-up water to enter the system. The entering make-up water powers the turbine which in turn drives the sump water discharge pump. The make-up water continues to enter the system to replace and add to the sump water in the catch basin until the water level in the basin is restored to its normal operating level, and the valve cuts off the flow of make-up water and the turbine and pump cease operation.

With the foregoing in mind, a principal object of the present invention is to provide a novel automatic make-up and bleed-off water system for cooling towers and the like entirely powered by the make-up water entering the system and which does not require an electrical power source at the cooling tower.

Another object of the present invention is to provide a novel make-up and bleed-off water system which will automatically withdraw and replace a quantity of water from an air-conditioning cooling tower catch basin to lower the concentration of impurities or foreign material in the basin.

Still another object of the present invention is to provide a novel water-powered pump which is highly economical to manufacture and assemble, yet which is fully effective in operation and use.

Other objects and a fuller understanding of the invention may be had by referring to the following description and claims taken in conjunction with the accompanying drawings.

Brief description of the drawings

FIG. 4 is a sectional view taken along the line 4—4 of FIG. 2;

FIG. 5 is an enlarged sectional view taken along the line 5—5 of FIG. 2;

FIG. 6 is a sectional view taken along the lines 6—6 of FIG. 5;

FIG. 7 is a fragmentary plan view of another apparatus embodying the present invention;

FIG. 8 is an enlarged fragmentary side elevational view of the apparatus shown in FIG. 7 with portions broken away; and FIG. 9 is a fragmentary sectional view taken along the line 9—9 of FIG. 8.

Description of the preferred embodiment

Figure 1:
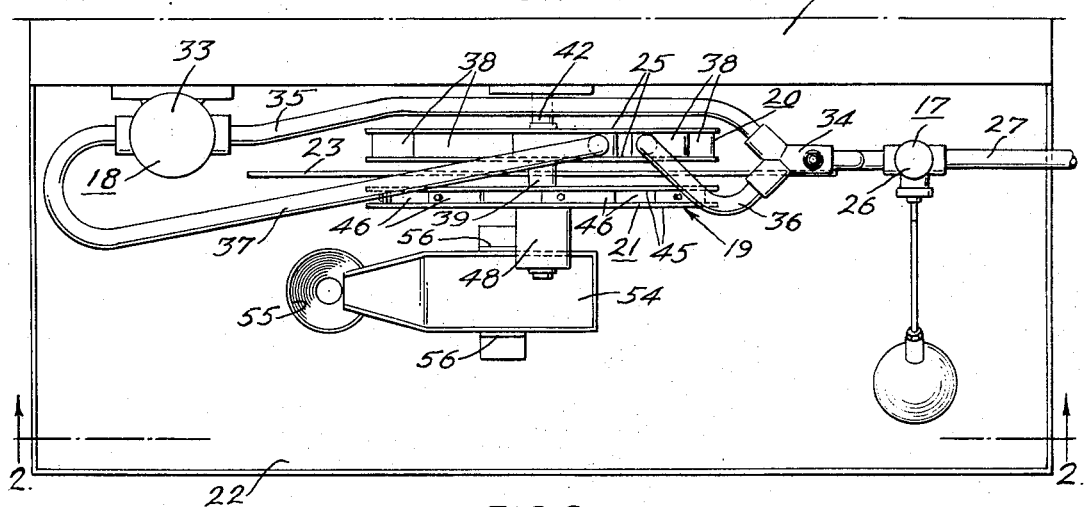
FIG. 1 is a fragmentary plan view of a cooling tower having a water powered make-up and bleed-off system embodying the present invention.

Generally, the present invention comprises a water-powered make-up and bleed-off system mounted in the catch basin of an air-conditioning cooling tower for maintaining the volume of the sump water and the level of concentration of impurities or other foreign material in the water. The system comprises a make-up water control means sensitive to the volume of water in the catch basin to control the amount of make-up water entering the catch basin, a chemical additive unit to chemically treat the make-up water, and a water-powered pump having a turbine rotor driven by the entering make-up water, and a pump rotor connected to the turbine rotor to discharge a quantity of sump water from the catch basin to a drain.

To insure that a quantity of make-up water is added to the catch basin and a quantity is replaced, the volume of entering make-up water is greater than the volume of sump water removed. This also provides sufficient power from the turbine to operate the pump.

In the embodiment of the present invention shown in FIGS. 1 through 6, the apparatus is mounted on a cooling tower 15 having a catch basin or sump 22 at the bottom thereof. The apparatus comprises a make-up water control means 17 responsive to the level of water in the catch basin 22 to control make-up water entering the system, a chemical additive unit 18 to chemically treat a portion of the make-up water and a water-powered pump 19 having a turbine rotor 20 and a pump rotor 21 connected in spaced relationship to the turbine rotor 20. The turbine rotor 20 and pump rotor 21 are mounted in the catch basin 22 on adjacent sides of a pump carry-over barrier 23. The make-up water entering the catch basin 22 is directed to power the turbine 20 and cause the pump 21 to remove a quantity of sump water 24 from the basin 22 for disposal.

In order to control the volume of sump water 24 in the catch basin 22, a make-up water control means 17 is provided. In the present instance, the control means 17 comprises a float-controlled valve connected to control the make-up water from a make-up water supply pipe 27. The valve is responsive to the level of the sump water 24 in the catch basin 22 and is opened to allow make-up water to enter the catch basin 22 when the level of the sump water falls below the normal operating level, and closes when the sump water level of the catch basin 22 is normal.

To properly condition the water in the tower and catch basin, a chemical additive unit 18 is provided to chemically treat the incoming make-up water. In this case, the additive unit 18 comprises a chemical treating device 33 to add a chemical to make-up water passed through the treating device 33 and a bypass valve 34 to direct a portion of the make-up water from the float-controlled valve 26 through the chemical treating device 33.

The bypass valve is generally T-shaped and proportions the flow from the valve 34 between a pipe 35 leading to the treating device 33 and a bypass outlet pipe 36 leading directly to the turbine 20. A pipe 37 carries the treated water from the treating device 33 to the turbine.

To control the amount of chemical added to the make-up water, the bypass valve 34 has a gate 40 as shown in FIG. 4 which may be positioned to direct any desired proportion of the make-up water through the bypass pipe 35 to the treating device 33. In this manner, by controlling the amount of make-up water diverted to the treating device 33, the amount of chemical added to the total make-up water entering the catch basin 22 may be controlled.

In accordance with the invention, a provision is made to discharge a quantity of the sump water 24 from the catch basin 22 automatically when adding make-up water.

In the present instance, a water-powered pump 19 is provided to remove a lesser quantity of sump water from the basin 22 than is entering from the make-up supply pipe 27. The pump 19 comprises a pump rotor 21 to pump a quantity of the sump water 24 from the catch basin 22 and a turbine rotor 20 to drive the pump rotor 21.

Figure 2:
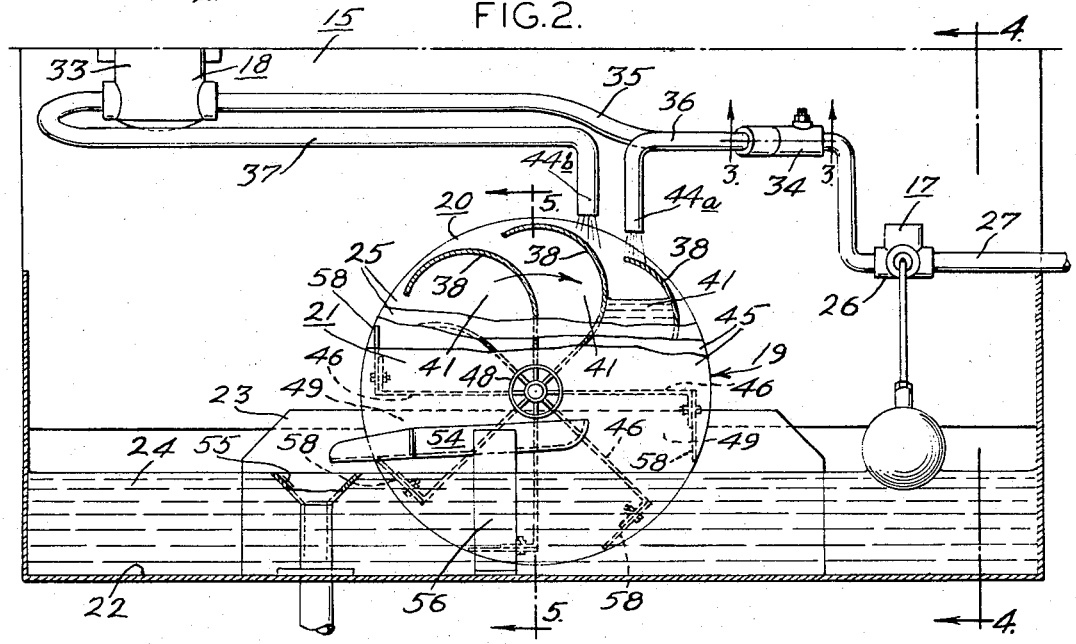
FIG. 2 is a side elevational view of the apparatus shown in FIG. 1 with portions broken away.
Figure 3:
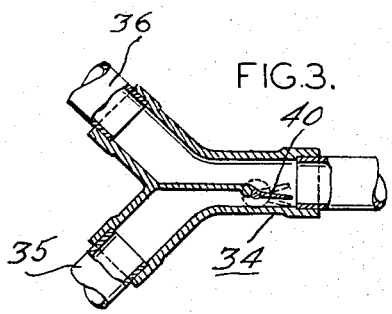
FIG. 3 is an enlarged sectional view taken along the line 3—3 of FIG. 2.

The turbine rotor 20, as shown in FIG. 2, comprises a pair of parallel concentric circular side plates 25 and a multiplicity of arcuate-shaped turbine blades 38 spanning between the plates and projecting radially outward and turned in a counterclockwise direction, as seen in FIG. 2, from a hub 39 to form a multiplicity of radially extending turbine pockets 41. A shaft 42 projecting from the wall of the cooling tower 15 mounts the hub 39 to allow the turbine 20 to rotate about the shaft 42.

To power the turbine, the main inlet pipe 36 and the bypass inlet pipe comprise make-up water supply means. In this instance outlet 44a of the pipe 36 and outlet 44b of inlet 37 are positioned adjacent to the turbine rotor to direct the make-up water into the turbine pockets 41. In operation, whenever the float-controlled valve 26 allows make-up water to pass through the main inlet pipe 36 and the bypass inlet pipe 37, the outlets 44a and 44b direct the water against the turbine blades 38 causing the turbine rotor 20 to turn about the shaft 42.

The pump rotor 21 is driven by the turbine rotor 20, and to this end, is mounted on the hub 39. As shown in FIGS. 2 and 5, the rotor 21 comprises a pair of concentric parallel circular side plates 45 and L-shaped pump blades 46 spanning between the plates projecting radially outward from the hub 39 and turned in a clockwise direction to form radially extending pump pockets 49 between each pair of pump blades 46. As best shown in FIGS. 5 and 6, the pump pockets terminate at their inner ends in axially extending discharge channels 53 formed by a tubular member 48 concentric with the hub 39 and having a multiplicity of walls 52 connected to the pump blades 46.

In operation, as the turbine 20 is turned by the incoming make-up water, the pump 21 is driven clockwise to cause the pump blades 46 to dip into the sump water in the catch basin and scoop up a portion of water in the radially extending pockets 49. The water flows by gravity, as the pump rotor 21 rotates, out through the axially extending channels 53.

To discharge the water flowing from the axially extending channels 53, the tubular member 48 opens into a discharge drain pan 54 mounted by a pan support 56 overlying a conventional overflow drain 55.

In order to vary the ratio of the bleed-off to the make-up water, the volumetric capacity of the pump may be varied. In the present instance, each pump blade 46 has an adjustable foot 58 which may be varied to change the volume of the sump water picked up by radially extending pockets 49 of the pump 21. It should be noted that the spacing between the plates 25 is substantially greater than the spacing between the plates 45 to insure that there is sufficient water in the pockets 41 to overbalance the sump water in the pockets 49 and thereby to effect rotation of the turbine and pump rotor.

To reduce the possibility of the incoming fresh make-up water being immediately picked up and discharged by the pump blades 46, a barrier 23 is provided to separate the two rotors. As shown in FIG. 5, the barrier 23 extends vertically from the bottom of the catch basin to a point above the sump water level. As the incoming make-up water in the turbine blades is mixed with the sump water on the turbine side of the barrier 23, the sump water on the pump side of the barrier is removed by the pump.

In operation, as a quantity of sump water is evaporated or otherwise lost from the cooling system, the water level in the catch basin is lowered below the normal working level. The float-controlled make-up water valve 26 responds to the lowered water level by allowing make-up water to enter the system and power the turbine 20. As the turbine 20 is powered by the entering make-up water, the pump 21 removes a lesser quantity of sump water. The make-up water enters the system and a lesser amount of water leaves the system until the water level in the catch basin is increased to its normal operating level. The float-controlled valve then closes and stops the operation.

*Description of an additional preferred embodiment*

The construction and arrangement of the system may be modified. For example, FIGS. 7 through 9 show a second embodiment of the invention mounted on the wall of a cooling tower 115 and comprising a make-up water control means 117, a chemical additive unit 118 to chemically treat all of the make-up water entering the system, and a water-powered pump 119 having an integrally connected turbine rotor 120 and pump rotor 121.

In order to control the volume of sump water in the catch basin, a make-up water control means 117 is provided. In the present instance, the control means 117 is similar to that of the first embodiment and comprises a float-controlled valve connected to control the make-up water from a make-up water supply pipe 127. The valve 126 is responsive to the level of the sump water in the catch basin and is opened to allow make-up water to enter the catch basin when the level of the sump water falls below the normal operating level.

To properly condition the water in the tower and catch basin, a chemical additive unit 118 is provided to chemically treat the incoming make-up water. In this case, the additive unit 118 comprises a chemical treating device having a conventional adjustment (not shown) therein to control the amount of chemical added to the water flowing therethrough. The treating tank 118 is connected directly to the float-controlled valve 126 by a supply pipe 135, and the entire supply of incoming make-up water is passed from the float-controlled valve 126 through the chemical treating tank 118 to a main inlet pipe 137 which carries the treated water from the tank 118 to the catch basin.

In accordance with the invention, a quantity of the sump water is bled from the catch basin each time the float-controlled valve 126 is actuated to add make-up water in the present instance by a water-powered pump 119. The pump 119 is similar to the pump 19, comprising a pump rotor 121 and a turbine rotor 120. However, instead of being separated, the rotors are integrally connected by the use of a common side plate.

Turbine rotor 120 is similar to that of the first embodiment and has a pair of parallel concentric circular side plates 125 and a multiplicity of arcuate-shaped turbine blades 138 spanning therebetween and extending radially outward from a hub 139 and turned in a counterclockwise direction to form pockets 141. A shaft 142 mounts the hub 139 on the tower side wall 115 to allow the turbine 120 to rotate about the shaft.

The pump rotor, as shown in FIGS. 8 and 9, comprises a circular side plate 145 which is concentric and parallel to the plates 125 of the turbine 120. Pump blades 146 span between the plate 145 and the adjacent plate 125 extending radially outward and turned in a clockwise direction to form radially extending pockets 149 between each pair of pump blades 146. In this embodiment of the invention, the pump blades are arcuate, the plate 125 adjacent to the plate 145 forms a common wall between the pump and turbine, and the barrier is eliminated.

As best shown in FIG. 9, the pump rotor 121 has a tubular discharge member 148 comprising a cylinder which forms a single axially extending channel 153 surrounding the hub 139 for discharging into a drain pan 154 overlying the overflow drain (not shown). The plate 145 has a circular aperture 162 surrounding the hub 139 opening into the member 148. The aperture 162 has a diameter smaller than the diameter of the outer cylinder 148 to form an annular wall 163 between the channel 153 and the radially extending pockets 149. This wall 163 acts as a check to prevent the back flow of water into the pump. It insures that all water emptied from the radially extending pockets 149 into the discharge does not flow into other pockets and return to the catch basin. In operation, the water-powered pump functions like the pump 19 to discharge sump water automatically as make-up water is introduced into the catch basin.

It is apparent that the construction and arrangement of the system may be modified by combining the features shown in the embodiments described above, and other modifications will be apparent to those skilled in the art. Thus, while particular embodiments of the present invention have been herein illustrated and described, it is not intended to limit the invention to such disclosures, but changes and modifications may be made therein and thereto under the scope of the following claims.

I claim:

1. A water-powered make-up and bleed-off system for automatically discharging sump water upon addition of make-up water to a catch basin, comprising; a turbine rotor having a multiplicity of turbine blades, said blades extending radially outward to form a multiplicity of turbine pockets, a supply means to direct make-up water into said turbine pockets to rotate said turbine rotor, said turbine pockets emptying upon rotation directly into said sump, and a pump rotor driven by said turbine rotor to pump a quantity of said sump water from said basin and discharge the same, said pump rotor having a multiplicity of pump blades extending radially outward to form a multiplicity of pump pockets, said pump blades being mounted to dip into said basin and scoop sump water into said pockets upon rotation of said rotor, and means to discharge said sump water from said pump pockets upon further rotation of said pump rotor.

2. A water-powered make-up and bleed-off system as in claim 1, wherein the total volumetric capacity of said pump pockets is less than the total volumetric capacity of said turbine pockets whereby the volume of said sump water discharged by said pump is less than the volume of said make-up water supplied by said supply means.

3. A water-powered make-up and bleed-off system as in claim 1, including a hub mounting said pump rotor and said turbine rotor concentrically to each other for rotation about a horizontal axis above the sump water level.

4. A water-powered make-up and bleed-off system as in claim 3, wherein said pump blades are L-shaped, extending radially outward from said hub and turned in a direction circumferentially of said rotor.

5. A water-powered make-up and bleed-off system as in claim 4, wherein each of said pump blades has an adjustable foot to regulate the volumetric capacity of each of said pump pockets.

6. A water-powered make-up and bleed-off system as in claim 3, wherein said pump blades are arcuate-shaped, extending radially outward from said hub and turned in a direction circumferentially of said rotor.

7. In an air conditioning system having a catch basin, means to supply make-up water to said basin to maintain a given water level therein, and means to bleed off sump water from said basin; the improvement wherein said means to bleed-off sump water comprises a pump rotor having a multiplicity of pump pockets, means mounting said rotor for rotation to cause said pockets at a lower position disposed to dip into the sump water in said basin and scoop water into said pockets and at an upper position disposed above said water level means to discharge said scooped water from said pockets in said upper position, and means to drive said pump rotor comprising a turbine rotor mounted in the flow path of said make-up water for rotation by the make-up water flowing into said basin, and means coupling said turbine rotor to said pump rotor to drive the latter.

8. A water-powered make-up and bleed-off system as in claim 7, wherein said means to discharge said sump water from said pump pockets comprises means to form an axially extending channel in fluid communication with each of said pump pockets whereby said sump water in each of said pump pockets flows by gravity through said channel when said pocket is in said upper position.

9. A water-powered make-up and bleed-off system as in claim 8, wherein said pump rotor has a side plate having a central aperture and radially extending blades mounted on one side of said plate and cooperable therewith to form said pockets, said discharge means comprising a tubular member at the opposite side of said plate in axial alignment with said aperture and of greater diameter whereby part of said plate forms an annular wall between said tubular member and said radial pump pockets, said central aperture therein providing said fluid communication between said pockets and said tubular member.

10. A water-powered make-up and bleed-off system as in claim 7 wherein said pump rotor and said turbine rotor are mounted in spaced relationship along a horizontal axis for common rotation, and including a barrier mounted in said catch basin between said pump rotor and said turbine rotor to separate said make-up water entering said catch basin from said turbine from said sump water being scooped from said catch basin by said pump pockets.

11. A water-powered make-up and bleed-off system as in claim 7 wherein said pump rotor and turbine rotors are integrally mounted on a hub for rotation about a horizontal axis and including a side plate common to said pump and turbine rotors mounting said pump blades on one side thereof and cooperating therewith to form said pockets, said turbine rotor comprising pocket-forming blades mounted on the other side of said side plate.

12. A water-powered make-up and bleed-off system as in claim 7 including means to control the level of sump water in the catch basin comprising a level-responsive valve to control the make-up water entering said basin, said valve having a float, responsive to the level of said sump water in said basin, to actuate said valve.

13. A water-powered make-up and bleed-off system as in claim 12, including a chemical additive unit connected to said outlet of said float-controlled valve to receive make-up water from said valve for chemical treatment and subsequent delivery to said catch basin.

14. A water-powered make-up and bleed-off system as in claim 13, including a bypass valve having an inlet port, a main outlet port and a bypass port, said inlet port connected to said outlet of said float-controlled valve, said main outlet port connected to said chemical additive unit, and said bypass port connected to a bypass pipe having an outlet adjacent to said turbine rotor to direct bypass make-up water into said turbine rotor.

References Cited
UNITED STATES PATENTS

| | | | |
|---|---|---|---|
| 1,134,215 | 4/1915 | Morse | 103—60 |
| 2,428,256 | 9/1947 | Yates. | |

ROBERT M. WALKER, *Primary Examiner.*